United States Patent
Swasdee

(10) Patent No.: US 7,689,807 B2
(45) Date of Patent: Mar. 30, 2010

(54) MASS STORAGE DEVICE, MASS STORAGE CONTROLLER AND METHODS FOR USE THEREWITH

(75) Inventor: Manot Swasdee, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 454 days.

(21) Appl. No.: 11/350,487

(22) Filed: Feb. 9, 2006

(65) Prior Publication Data

US 2007/0186041 A1  Aug. 9, 2007

(51) Int. Cl.
G06F 9/26 (2006.01)
G06F 9/34 (2006.01)

(52) U.S. Cl. ........................ 711/221; 711/111; 711/156; 711/206; 711/103

(58) Field of Classification Search .................. 711/112, 711/221
See application file for complete search history.

(56) References Cited

U.S. PATENT DOCUMENTS

| | | | |
|---|---|---|---|
| 5,524,230 A * | 6/1996 | Sakaue et al. | 711/103 |
| 7,398,348 B2 * | 7/2008 | Moore et al. | 711/103 |
| 2003/0065866 A1 * | 4/2003 | Spencer | 710/306 |
| 2004/0111582 A1 * | 6/2004 | Maeda et al. | 711/202 |
| 2006/0277334 A1 * | 12/2006 | Sim et al. | 710/62 |

* cited by examiner

*Primary Examiner*—Brian R Peugh
*Assistant Examiner*—Prasith Thammavong
(74) *Attorney, Agent, or Firm*—Meschkow & Gresham, PLC

(57) ABSTRACT

A mass storage controller includes a packet filter module for receiving a packet containing an updated sector of a remote file allocation table from a host device. The packet filter module is further operable for scanning the updated sector contents to determine their state. The updated sector is written to a local file allocation table of a local device when the state of the updated sector contents match a first state. An original sector of the local file allocation table corresponding to the updated sector is retained when the state of the updated sector contents match a second state.

20 Claims, 7 Drawing Sheets

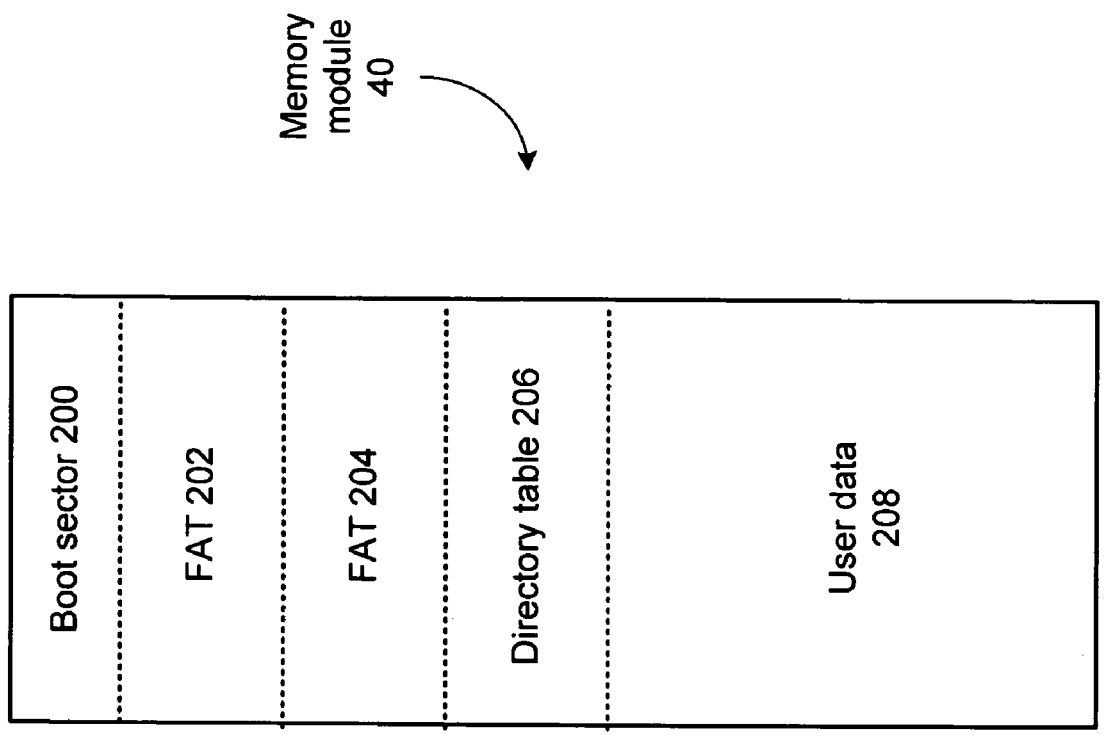

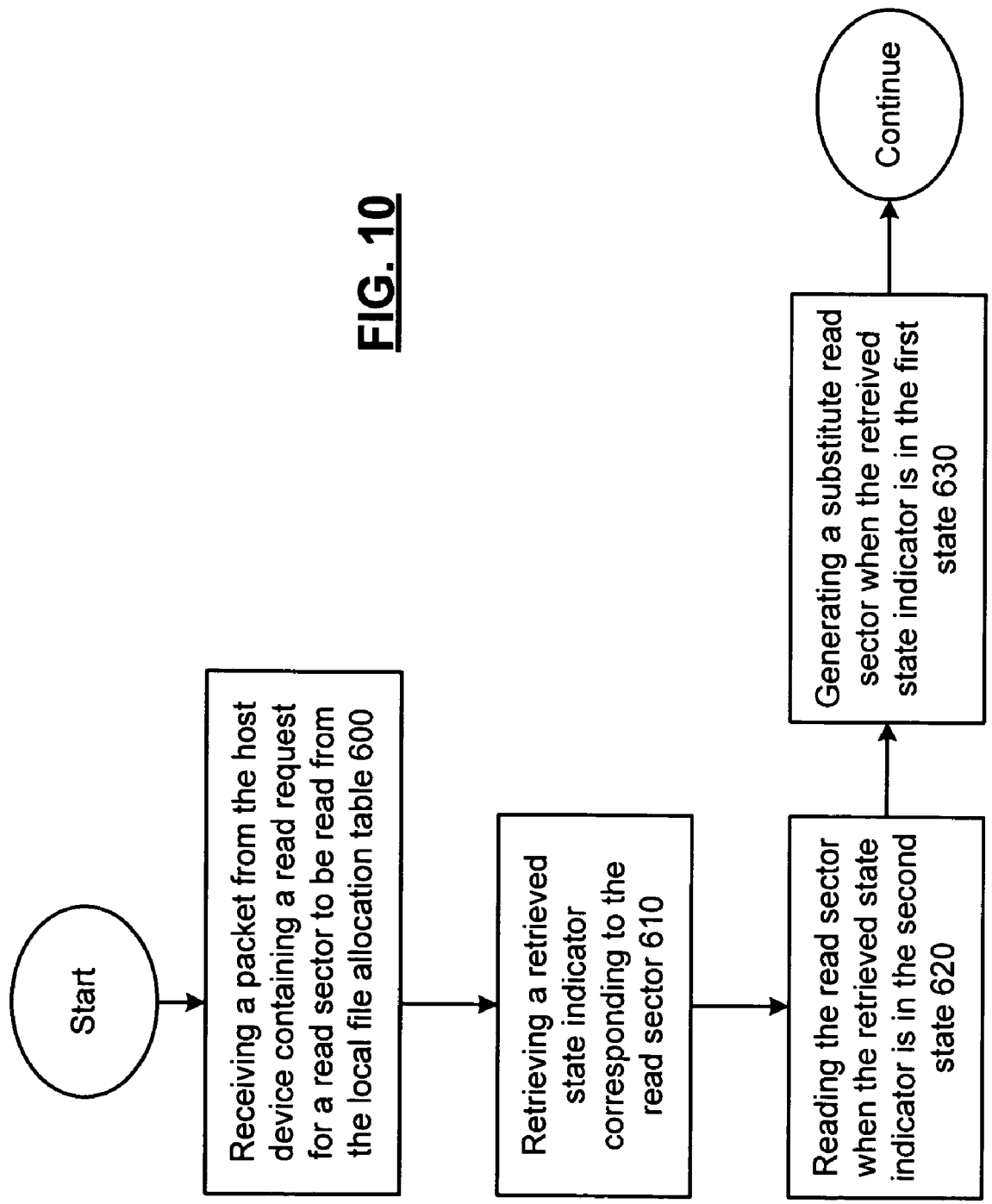

MASS STORAGE DEVICE, MASS STORAGE CONTROLLER AND METHODS FOR USE THEREWITH

BACKGROUND OF THE INVENTION

1. Technical Field of the Invention

The present invention relates to mass storage devices, to mass storage controllers and related methods for storing data.

2. Description of Related Art

Most electronic devices include some form of mass storage device for storing data such as program code and control information, data files such as may be text files, presentation files, user profile information for access to varies computer services (e.g., Internet access, email, etc.), digital audio files (e.g., MP3 files, WMA—Windows Media Architecture—, mp3 PRO, Ogg Vorbis, AAC—Advanced Audio Coding), digital video files [e.g., still images or motion video such as MPEG (motion picture expert group) files, JPEG (joint photographic expert group) files, etc.], address book information, and/or any other type of information that may be stored in a digital format. Mass storage devices include components such as flash drives, also known as thumb drives and pen drives, as well as hard disks, floppy disks, compact disk read only memories (CD-ROMs) digital video disk read only memories, and other memories that store information on a storage medium such as an optic or magnetic storage medium or in an integrated circuit memory such as a random access memory (RAM) or a read only memory (ROM).

These mass storage devices typically store data in a file format that utilize a File Allocation Table (FAT) that is used to share data between a device such as a host device having an operating system, and the mass storage device. Examples of such file formats include FAT12, FAT16, FAT32, Virtual FAT (VFAT), FASTFAT, as well as high performance file system (HPFS) and NT file system (NTFS). As data is written to and read from the mass storage device, the file allocation table is continually updated to keep track of the files that are stored. The time taken to update the file allocation table is included in time required to access the stored data. Longer access time can slow the operation of the host device in applications that are data intensive.

Therefore, a need exists for mass storage devices with reduced access time.

BRIEF DESCRIPTION OF THE SEVERAL VIEWS OF THE DRAWINGS

FIG. 3 presents a block diagram representation of a memory module in accordance with an embodiment of the present invention.

FIG. 10 presents a flowchart representation of a method in accordance with an embodiment of the present invention.

DETAILED DESCRIPTION OF THE INVENTION

Figure 1:
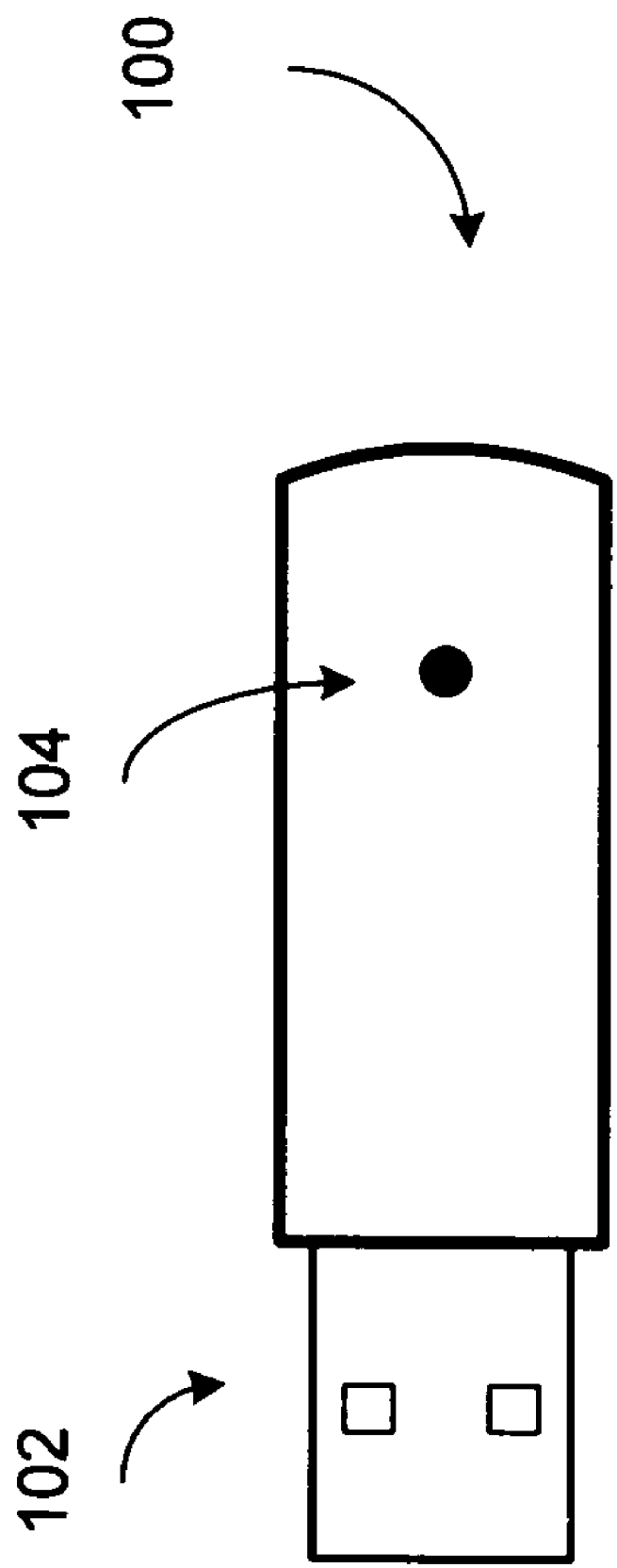
FIG. 1 presents a pictorial representation of a mass storage device in accordance with an embodiment of the present invention.

FIG. 1 presents a pictorial representation of a flash drive in accordance with an embodiment of the present invention. In particular, a flash drive 100 is presented that includes a Universal Serial Bus (USB) connector 102 for coupling to a USB port of a computer or other host device. A visual indicator such as light-emitting diode 104 is optionally included for providing a visual indication to a user that the device is connected and/or in operation. Flash drive 100 includes the mass storage device, mass storage controller and/or methods in accordance with an embodiment of the present invention as described in greater detail in association with the figures that follow.

Figure 2:
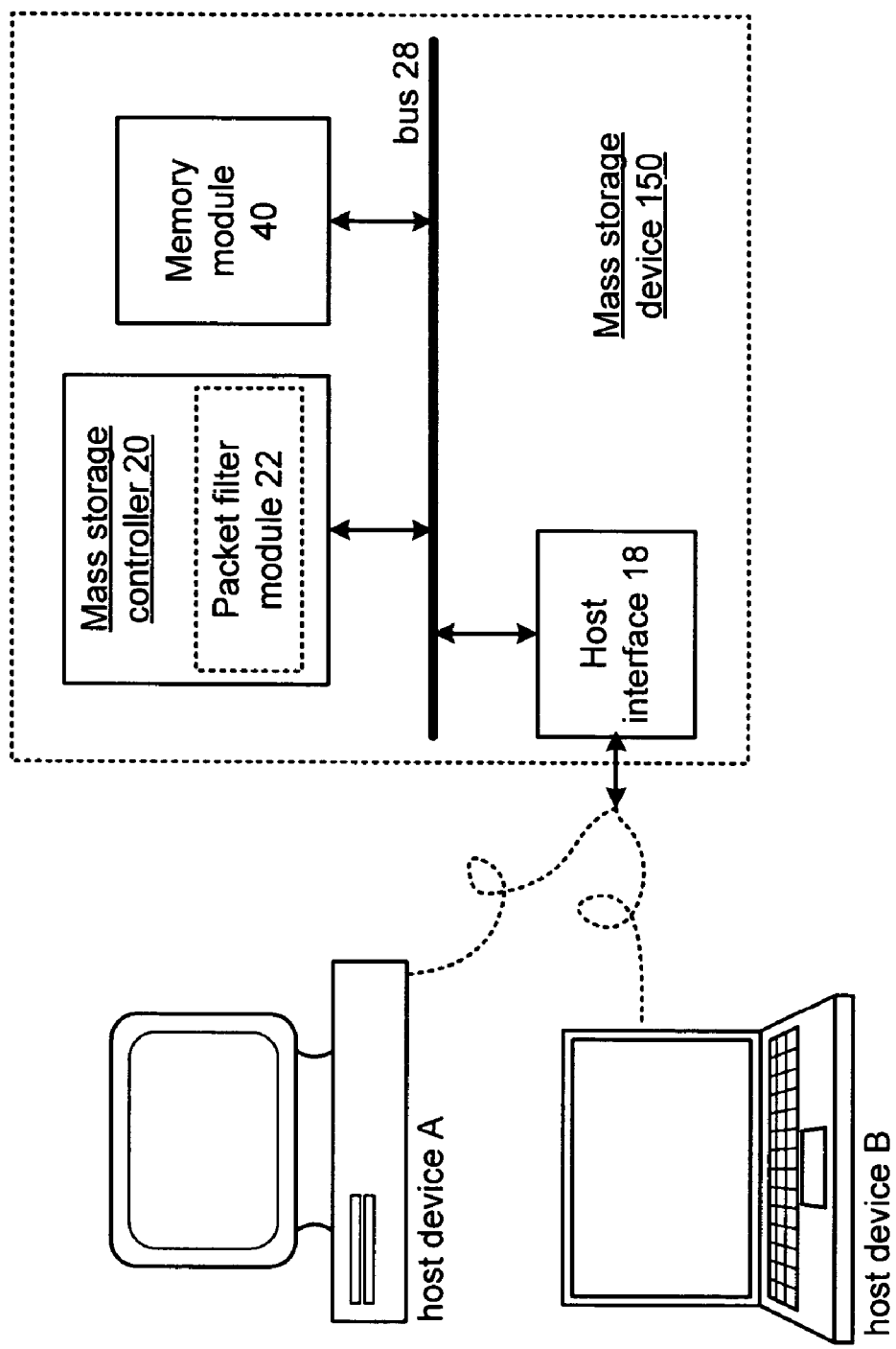
FIG. 2 presents a pictorial/block diagram representation of flash drive in accordance with an embodiment of the present invention.

FIG. 2 presents a pictorial/block diagram representation of mass storage device in accordance with an embodiment of the present invention. In particular, mass storage device 150, such as flash drive 100, includes a host interface 18 for interfacing the mass storage device to a host device such as host device A and/or host device B that are shown. Mass storage device 150 further includes a mass storage controller 20 and memory module 40 that communicate via bus 28. In an embodiment of the present invention, mass storage controller 20 includes a processor for executing a series of operational instructions for writing blocks of host data to the memory module in response to write commands from a host device and for retrieving blocks of stored data for transmission to the host device in response to read commands from the host device. Mass storage controller provides the functionality of packet filter module 22 that will be described in greater detail in association with FIG. 3.

Mass storage controller 20 includes a processor that can be implemented using a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in memory. Note that when the mass storage controller 20 implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. Further note that the mass storage controller 20 executes operational instructions corresponding to at least some of the steps and/or functions illustrated herein.

Mass storage controller 20, memory module 40 and host interface 18 may be implemented as one or more integrated circuits or included in one or more system on a chip integrated circuits. Further, while a particular bus architecture is shown in FIG. 2, alternative bus architectures that include further connectivity, such as direct connectivity between the various modules, are likewise possible to implement the features and functions included in the various embodiments of the present invention.

Mass storage device 150 can be operably coupled to a host device A, or B which may be a personal computer, workstation, server (which are represented by host device A), a laptop computer (host device B), a personal digital assistant and/or any other device that may transceive data with the mass storage device 150. In an embodiment of the present invention the host device includes an operating system such as Windows, Windows NT, Windows XP, O/S2, Mac OS, linux or any other operating system or protocol that supports a file format that includes a File Allocation Table (FAT) or similar data structure used to share data between a host device and a mass storage device 150. Examples of such file formats include FAT12, FAT16, FAT32, Virtual FAT (VFAT), FAST-FAT, as well as HPFS or NTFS, and other file systems that are otherwise compatible with or convertible to a FAT file format or that use a file allocation table or similar data structure.

The host interface 18 facilitates the transfer of data between the host device A or B and mass storage device 150. When mass storage device 150 is coupled to the host device, the file allocation table is copied from the mass storage device to the host device. If the operating system of the host device includes plug and play functionality, this copying of the file allocation table occurs automatically during an enumeration process. In the alternative, the host device may otherwise initiate the setup of the interface between the host device and the mass storage device 150 either manually or automatically, based on the operating system, the system settings, etc.

Data received from the host device A or B is first received via the host interface 18. Depending on the type of coupling between the host device and the mass storage device 150, the received data will be formatted in a particular manner. For example, if the mass storage device is coupled to the host device via a USB connection or cable, the received data will be in accordance with the format proscribed by the USB specification. The host interface 18 converts the format of the received data (e.g., USB format) into a desired format by removing overhead data that corresponds to the format of the received data and storing the remaining data as data words. The size of the data words generally corresponds directly to, or a multiple of, the bus width of bus 28 and the word line size (i.e., the size of data stored in a line of memory) of memory module 40. Under the control of the mass storage controller 20, the data words are provided to memory module 40 for storage. In this mode, the mass storage device 150 is functioning as extended memory of the host device.

Further, the host device may retrieve data from memory module 40 as if the memory were part of the computer. Accordingly, the host device provides a read command to the mass storage device 150, which is received via the host interface 18. The host interface 18 converts the read request into a generic format and provides the request to the mass storage controller 20. The mass storage controller 20 interprets the read request and coordinates the retrieval of the requested data from memory module 40. The retrieved data is provided to the host interface 18, which converts the format of the retrieved data from the generic format of the mass storage device 150 into the format of the coupling between the mass storage device and the host device. The host interface 18 then provides the formatted data to the host device via the coupling.

The coupling between the host device and the mass storage device 150 may be a wireless connection or a wired connection. For instance, a wireless connection, provided by transceiver module 30 may be in accordance with Bluetooth, IEEE 802.11x, and/or any other wireless LAN (local area network) protocol, IrDA, etc. The wired connection may be in accordance with one or more Ethernet protocols, Firewire, USB, etc. Depending on the particular type of connection, the host interface 18 includes a corresponding encoder and decoder. For example, when the mass storage device 150 is coupled to the host device via a USB cable, the host interface 18 includes a USB encoder and a USB decoder. In an embodiment of the present invention, when the mass storage device 150 is coupled to the host device A or B via a wired connection or direct coupling, the host device may power the mass storage device.

Further features and function in accordance with the present invention and further embodiments, including a particular structure for memory module 40 and particular functions performed by packet filter module 22 are discussed in association with FIG. 3 and the figures that follow.

FIG. 3 presents a block diagram representation of a memory module in accordance with an embodiment of the present invention. The memory module 40 can be a single memory device or a plurality of memory devices. Such a memory device may include a read-only memory, random access memory, volatile memory, non-volatile memory, static memory, dynamic memory, flash memory, cache memory, and/or any device that stores digital information. Memory module 40 includes a boot sector 200 and, for redundancy, two copies of the file allocation table, FAT 202 and FAT 204. A directory table 206 is included that presents a folder of each file or directory of user file data that is stored in memory module in user data 208.

The user data 208 stored in memory module 40, which may have 64 Mbytes or greater of storage capacity, may be text files, presentation files, user profile information for access to varies computer services (e.g., Internet access, email, etc.), digital audio files (e.g., MP3 files, WMA—Windows Media Architecture—, mp3 PRO, Ogg Vorbis, AAC—Advanced Audio Coding), digital video files [e.g., still images or motion video such as MPEG (motion picture expert group) files, JPEG (joint photographic expert group) files, etc.], address book information, and/or any other type of information that may be stored in a digital format.

The file allocation table is divided into a plurality of sectors. Each sector can be between 512 bytes to 4 Mbytes but other sizes can be used depending on the particular file system. Sectors are addressed by logical block addresses (LBA) that include a sector, track and head number that, in a manner analogized to magnetic storage disks, correspond to the particular sectors of the memory that are available for use. As data is written to and read from the mass storage device 150, the file allocation table is periodically updated to keep track of the data that is stored. In particular, the host device can send an updated sector of the file allocation table (from its remote file allocation table) to the mass storage device 150 for replication in its local file allocation table. In addition, the host device may request to read a sector from the local file allocation table of the mass storage device 150.

In an embodiment of the present invention, the updating of, and reading from, the local file allocation table of mass storage device 150 is performed on FAT 202 with FAT 204 updated, as time permits, to maintain a copy of FAT 202. However, FAT 204 may be otherwise accessed, particularly by system commands of mass storage controller 20, or by memory repair utilities of the host device in the event that FAT 202 becomes corrupted or for other purposes.

In an embodiment of the present invention, mass storage controller 20 includes a packet filter module 22 for receiving a packet containing an updated sector of the file allocation table from the host device. The packet filter module 22 is further operable for scanning the updated sector contents to determine their state. The updated sector is written to a local file allocation table, such as FAT 202, when the state of the updated sector contents match a first state. An original sector of the local file allocation table corresponding to the updated sector is retained when the state of the updated sector contents match a second state.

In an embodiment of the present invention, the first state is a non-empty state and the second state is an empty state: Packet filter module 22 scans an incoming updated sector to determine if it is in an empty state—meaning the sector payload contains a default value such as all zeroes that indicates that the corresponding portion of user data 208 is not currently in use. If so, the local file allocation table is not updated and a acknowledge packet is returned to the host device that indicates that the updated sector has been written. Because the acknowledgement packet is sent without having to wait for the updated sector to be written, the corresponding transaction time is saved.

In an embodiment of the present invention, packet filter module 22 stores a plurality of state indicators in a look-up table that is indexed by a plurality of block addresses, such as the logical block addresses corresponding to the plurality of sectors of FAT 202. Each state indicator can be implemented with a single bit that has a first state if the sector is empty and a second state if the sector is non-empty. In operation, packet filter module 22 compares the state of the updated sector contents to that state indicator of the corresponding sector of FAT 202. The state indicator is updated when the state of the updated sector contents does not match—indicating that a sector of FAT 202 that was non-empty is now being updated as an empty sector or that a sector of FAT 202 that was empty is now to be updated as non-empty.

As mentioned above, if an updated sector of the file allocation table of the host device is empty, there is no need to write the empty sector data to FAT 202. Even if the sector was previously non-empty, the sector can be treated as an empty sector by checking the state of the sector from the look-up table prior to the file allocation table from being read. In particular, packet filter module 22 is further operable for receiving a packet from the host device containing a read request for a read sector to be read from the local file allocation table. In response, a retrieved state indicator is retrieved corresponding to the read sector. If the retrieved state indicator is in the non-empty state the sector is read from FAT 202. If the retrieved state indicator is in an empty state, a substitute read sector is generated and provided to the host device-instead of reading the sector from FAT 202. Because the sector is an empty sector, the corresponding empty state data, such all zeroes, can be generated faster than by reading the data from memory module 204. This also saves time in the implementation of mass storage device 150.

Figure 6:
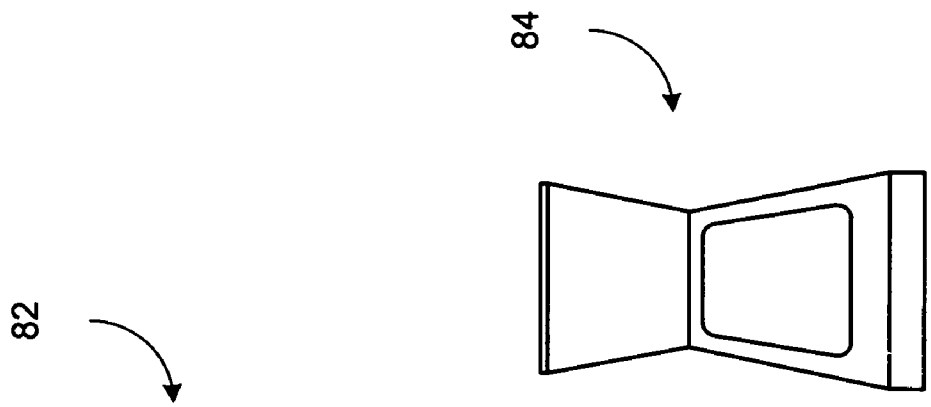
FIGS. 4-6 present pictorial diagram representations of portable electronic devices that include mass storage devices in accordance with an embodiment of the present invention.
Figure 5:
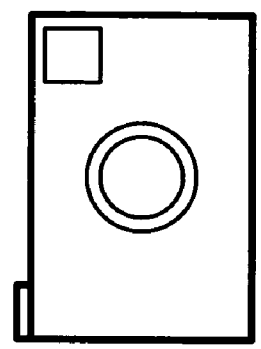
Figure 4:
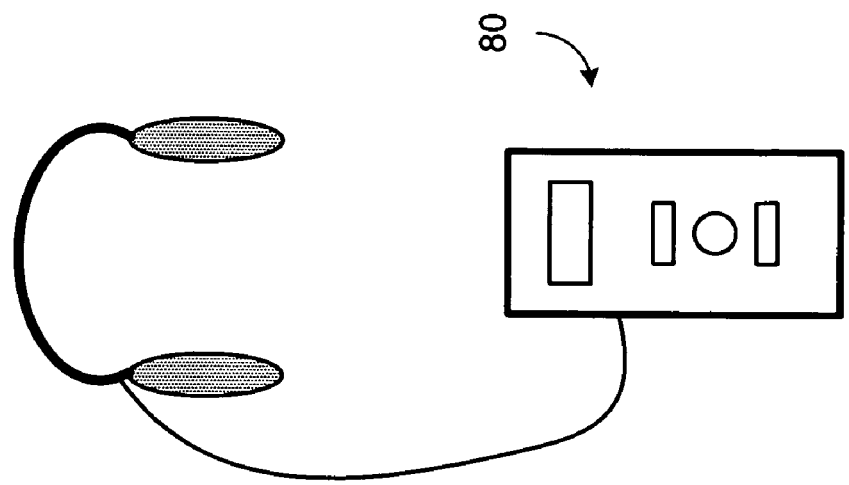

FIGS. 4-6 present pictorial diagram representations of portable electronic devices that include mass storage devices in accordance with an embodiment of the present invention. While the mass storage device 150 has been described in terms of a flash drive implementation, mass storage device 150 may also be implemented directly in any of a wide variety of other electronic devices, including portable electronic devices such as a portable audio player 80 for playing stored or streaming audio content or video content, a digital camera 82 for capturing still images and/or video images that may or may not include corresponding audio or audio clips.

Mass storage device 150 can also be included in a personal digital assistant 84 that includes such function as providing access to stored calendar and address book information, and for optionally providing Internet access or access to a data or telephone network through a long range wireless link that can include cellular, personal communications service (PCS), general packet radio service (GPRS), global system for mobile communications (GSM), and integrated digital enhanced network (iDEN) or a short range wireless link such as 802.11x, Wimax, a wireless local area network connection or other communications link.

In these portable electronic devices, memory module 40 can include an internal memory solid state memory, a removable memory such as a memory card in a format such as CompactFlash, SmartMedia, Memory Stick, Secure Digital (SD) card, xD card or other memory card format, or a memory drive such as a small form factor magnetic or optical storage drive. In an embodiment of the present invention, memory module 40 can store data such as text files, presentation files, user profile information for access to varies computer services (e.g., Internet access, email, etc.), digital audio files (e.g., MP3 files, WMA—Windows Media Architecture—, mp3 PRO, Ogg Vorbis, AAC—Advanced Audio Coding), digital video files [e.g., still images or motion video such as MPEG (motion picture expert group) files, JPEG (joint photographic expert group) files, etc.], address book information, and/or any other type of information that may be stored in a digital format.

In these portable electronic devices, mass storage controller 20 can be implemented in a separate device or be implemented as operational instructions on a processor used by the portable electronic device to execute other operations such as system programs, application programs, and other routines.

Figure 7:
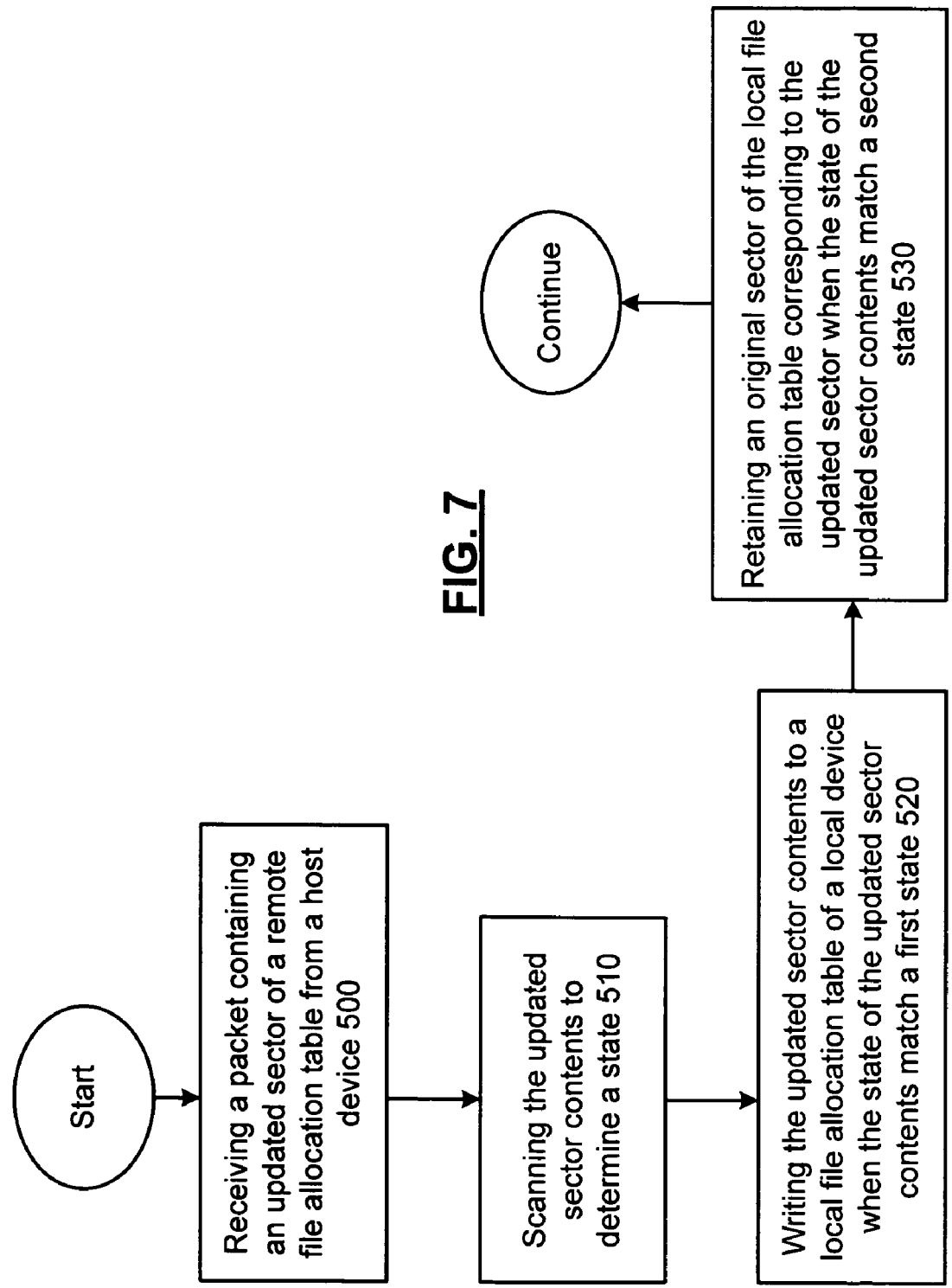
FIG. 7 presents a flowchart representation of a method in accordance with an embodiment of the present invention.

FIG. 7 presents a flowchart representation of a method in accordance with an embodiment of the present invention. In particular, a method is presented for use in accordance with one or more of the functions and features described in conjunction with FIGS. 1-6. In step 500 a packet is received containing an updated sector of a remote file allocation table from a host device, the updated sector having updated sector contents. In step 510, the contents of the updated sector are scanned to determine a state of the updated sector contents. In step 520, the updated sector is written to a local file allocation table of a local device when the state of the updated sector contents match a first state. In step 530, an original sector of the local file allocation table corresponding to the updated sector, is retained when the state of the updated sector contents match a second state. In an embodiment of the present invention, the second state is an empty state and the first state is a non-empty state.

Figure 8:
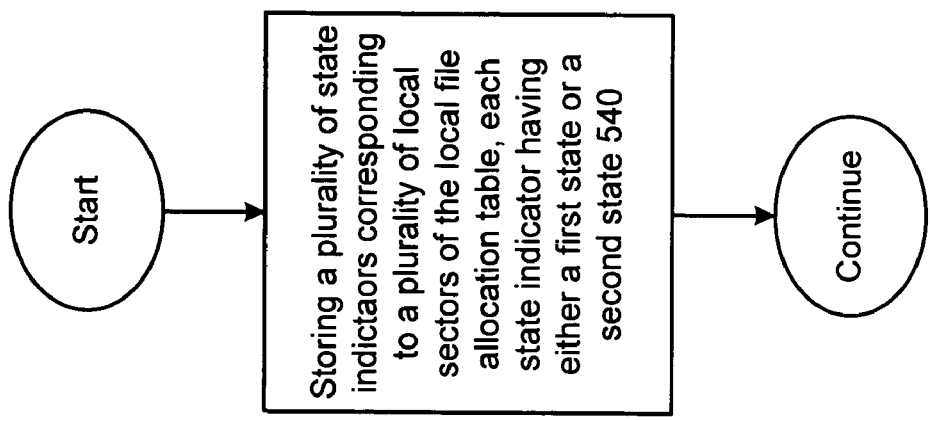
FIG. 8 presents a flowchart representation of a method in accordance with an embodiment of the present invention.

FIG. 8 presents a flowchart representation of a method in accordance with an embodiment of the present invention. In particular, a method is presented for use in accordance with one or more of the functions and features described in conjunction with FIGS. 1-7. In step 540, a plurality of state indicators are stored corresponding to a plurality of local sectors of the local file allocation table. Each of the state indicators include one of: the first state and the second state. In an embodiment of the present invention, step 540 includes storing the plurality of state indicators in a look-up table that is indexed by a plurality of block addresses corresponding to the plurality of local sectors.

Figure 9:
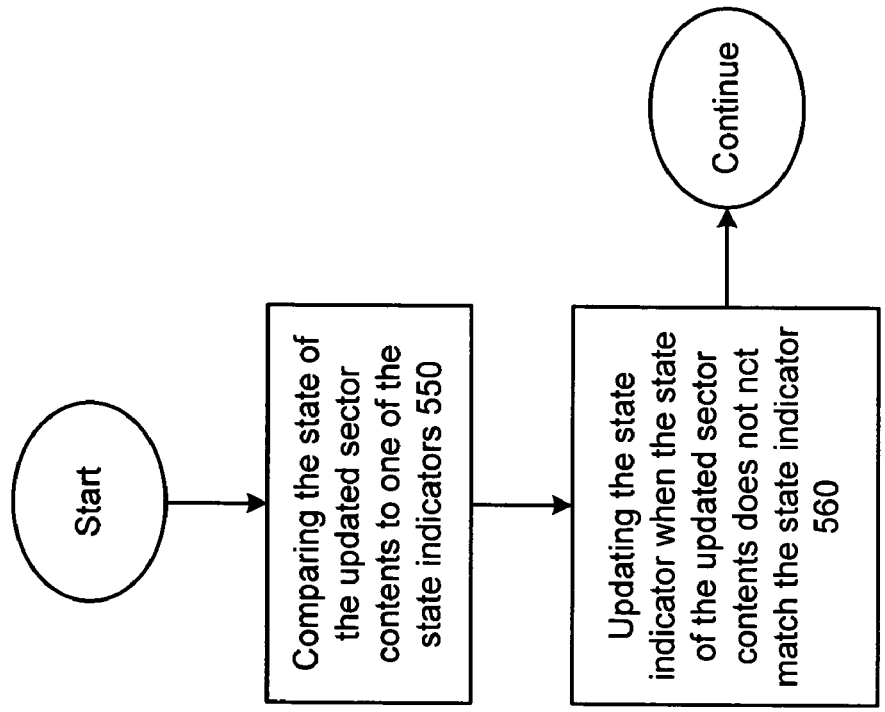
FIG. 9 presents a flowchart representation of a method in accordance with an embodiment of the present invention.

FIG. 9 presents a flowchart representation of a method in accordance with an embodiment of the present invention. In particular, a method is presented for use in accordance with one or more of the functions and features described in conjunction with FIGS. 1-8. In step 550, the state of the updated sector contents is compared to one of the plurality of state indicators. In step 560, the one of the plurality of state indicators is updated when the state of the updated sector contents does not match the one of the plurality of state indicators.

FIG. 10 presents a flowchart representation of a method in accordance with an embodiment of the present invention. In particular, a method is presented for use in accordance with one or more of the functions and features described in conjunction with FIGS. 1-9. In step 600, a packet is received from the host device containing a read request for a read sector to be read from the local file allocation table. In step 610, a state indicator of the plurality of state indicators is retrieved that corresponds to the read sector. In step 620, the read sector is read from the local file allocation table when the retrieved state indicator is in the first state. In step 630, a substitute read sector is generated when the retrieved state indicator is in the second state. In an embodiment of the present invention, the substitute read sector corresponds to an empty sector.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

In preferred embodiments, the various circuit components are implemented using 0.35 micron or smaller CMOS technology and can include one or more system on a chip integrated circuits that implement any combination of the devices, modules, submodules and other functional components presented herein. Provided however that other circuit technologies including other transistor, diode and resistive logic, both integrated or non-integrated, may be used within the broad scope of the present invention. Likewise, various embodiments described herein can also be implemented as software programs running on a computer processor. It should also be noted that the software implementations of the present invention can be stored on a tangible storage medium such as a magnetic or optical disk, read-only memory or random access memory and also be produced as an article of manufacture.

Thus, there has been described herein an apparatus and method, as well as several embodiments including a preferred embodiment, for implementing a mass storage device and mass storage controller. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A mass storage device comprising:
a host interface, for interfacing to a host device;
a memory module, operably coupled to the host interface; and
a mass storage controller, operably coupled to the host interface and the memory module, for writing blocks of host data to the memory module in response to write commands from the host device and for retrieving blocks of stored data for transmission to the host device in response to read commands from the host device, the mass storage controller including:
a packet filter module for receiving a packet containing an updated sector of a remote file allocation table from the host device, the updated sector having updated sector contents, the packet filter module further operable for scanning the updated sector contents to determine a state of the updated sector contents, for writing the updated sector to a local file allocation table stored in the memory module when the state of the updated sector contents matches a non-empty state, and for retaining an original sector of the local file allocation table corresponding to the updated sector when the state of the updated sector contents matches an empty state, the non-empty state indicating that a portion of user data corresponding to the updated sector contents is currently in use, and the empty state indicating that the portion of user data corresponding to the updated sector contents is not currently in use.

2. The mass storage controller of claim 1 wherein the packet filter module is further operable for storing a plurality of state indicators corresponding to a plurality of local sectors of the local file allocation table, each of the state indicators including one of: the non-empty state and the empty state.

3. The mass storage controller of claim 2 wherein the packet filter module stores the plurality of state indicators in a look-up table that is indexed by a plurality of block addresses corresponding to the plurality of local sectors.

4. The mass storage controller of claim 2 wherein the packet filter module is further operable to compare the state of the updated sector contents to one of the plurality of state indicators and to update the one of the plurality of state indicators when the state of the updated sector contents does not match the one of the plurality of state indicators.

5. The mass storage controller of claim 2 wherein the packet filter module is further operable for receiving a packet from the host device containing a read request for a read sector to be read from the local file allocation table, for retrieving a retrieved state indicator of the plurality of state indicators corresponding to the read sector, for reading the read sector when the retrieved state indicator is in the non-empty state and for generating a substitute read sector when the retrieved state indicator is in the empty state.

6. The mass storage controller of claim 5 wherein the substitute read sector corresponds to an empty sector.

7. The mass storage controller of claim 1 wherein the packet filter module is implemented in a system on a chip integrated circuit.

8. A mass storage controller comprising:
a processor;
a computer-readable storage medium; and
executable code recorded on the computer-readable storage medium for instructing the processor to manage a local file allocation table of a local device, the executable code including:

a packet filter module for receiving a packet containing an updated sector of a remote file allocation table from a host device, the updated sector having updated sector contents, the packet filter module further operable for scanning the updated sector contents to determine a state of the updated sector contents, for writing the updated sector to the local file allocation table of the local device when the state of the updated sector contents matches a non-empty state, and for retaining an original sector of the local file allocation table corresponding to the updated sector when the state of the updated sector contents matches an empty state, the non-empty state indicating that a portion of user data corresponding to the updated sector contents is currently in use, and the empty state indicating that the portion of user data corresponding to the updated sector contents is not currently in use.

9. The mass storage controller of claim 8 wherein the packet filter module is further operable for storing a plurality of state indicators corresponding to a plurality of local sectors of the local file allocation table, each of the state indicators including one of: the non-empty state and the empty state.

10. The mass storage controller of claim 9 wherein the packet filter module stores is further operable for storing the plurality of state indicators in a look-up table that is indexed by a plurality of block addresses corresponding to the plurality of local sectors.

11. The mass storage controller of claim 9 wherein the packet filter module is further operable to compare the state of the updated sector contents to one of the plurality of state indicators and to update the one of the plurality of state indicators when the state of the updated sector contents does not match the one of the plurality of state indicators.

12. The mass storage controller of claim 9 wherein the packet filter module is further operable for receiving a packet from the host device containing a read request for a read sector to be read from the local file allocation table, for retrieving a retrieved state indicator of the plurality of state indicators corresponding to the read sector, for reading the read sector when the retrieved state indictor is in the non-empty state and for generating a substitute read vector when the retrieved state indicator is in the empty state.

13. The mass storage controller of claim 12 wherein the substitute read sector corresponds to an empty sector.

14. The mass storage controller of claim 8 wherein the packet filter module is implemented in a system on a chip integrated circuit.

15. A method comprising:
receiving a packet containing an updated sector of a remote file allocation table from a host device, the updated sector having updated sector contents;
scanning the updated sector contents to determine a state of the updated sector contents;
writing the updated sector to a local file allocation table of a local device when the state of the updated sector contents matches a non-empty state, the non-empty state indicating that a portion of user data corresponding to the updated sector contents is currently in use; and
retaining an original sector of the local file allocation table corresponding to the updated sector, when the state of the updated sector contents matches an empty state, the empty state indicating that the portion of user data corresponding to the updated sector contents is not currently in use.

16. The method of claim 15 further comprising:
storing a plurality of state indicators corresponding to a plurality of local sectors of the local file allocation table, each of the state indicators including one of: the non-empty state and the empty state.

17. The method of claim 16 wherein the step of storing a plurality of state indicators includes storing the plurality of state indicators in a look-up table that is indexed by a plurality of block addresses corresponding to the plurality of local sectors.

18. The method of claim 16 further comprising:
comparing the state of the updated sector contents to one of the plurality of state indicators; and
updating the one of the plurality of state indicators when the state of the updated sector contents does not match the one of the plurality of state indicators.

19. The method of claim 16 further comprising:
receiving a packet from the host device containing a read request for a read sector to be read from the local file allocation table;
retrieving a retrieved state indicator of the plurality of state indicators corresponding to the read sector;
reading the read sector when the retrieved state indicator is in the non-empty state; and
generating a substitute read sector when the retrieved state indicator is in the empty state.

20. The method of claim 19 wherein the substitute read sector corresponds to an empty sector.

* * * * *